US010551500B2

(12) United States Patent
Appleby et al.

(10) Patent No.: US 10,551,500 B2
(45) Date of Patent: *Feb. 4, 2020

(54) INFRARED OPTICAL ELEMENT FOR PROXIMITY SENSOR SYSTEM

(71) Applicant: Facebook Technologies, LLC, Menlo Park, CA (US)

(72) Inventors: Matthew Christopher Appleby, Palo Alto, CA (US); Dong Yang, Milpitas, CA (US); Fei Liu, San Jose, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,268

(22) Filed: May 14, 2019

(65) Prior Publication Data

US 2019/0310369 A1    Oct. 10, 2019

Related U.S. Application Data

(63) Continuation of application No. 15/949,900, filed on Apr. 10, 2018, now Pat. No. 10,330,789.

(51) Int. Cl.
*G01S 17/08*    (2006.01)
*G01S 17/02*    (2006.01)
*G01S 7/481*    (2006.01)

(52) U.S. Cl.
CPC ............ *G01S 17/08* (2013.01); *G01S 7/4813* (2013.01); *G01S 17/026* (2013.01)

(58) Field of Classification Search
CPC ....... G01S 7/4813; G01S 17/026; G01S 17/08
See application file for complete search history.

(56) References Cited

U.S. PATENT DOCUMENTS

| 9,250,445 B2 | 2/2016 | Tosaya et al. |
| 10,330,789 B1 * | 6/2019 | Appleby ................. G01S 17/08 |
| 2012/0104242 A1 | 5/2012 | Chin et al. |
| 2013/0153755 A1 | 6/2013 | Pikkujamsa et al. |
| 2015/0069224 A1 | 3/2015 | Yoshimura |
| 2018/0031728 A1 | 2/2018 | Han |

OTHER PUBLICATIONS

Appleby, Ex Parte Quayle Office Action, U.S. Appl. No. 15/949,900, dated Nov. 6, 2018, 8 pgs.
Appleby, Notice of Allowance, U.S. Appl. No. 15/949,900, dated Feb. 14, 2019, 8 pgs.

* cited by examiner

*Primary Examiner* — Mark R Gaworecki
(74) *Attorney, Agent, or Firm* — Morgan, Lewis & Bockius LLP

(57) ABSTRACT

An optical device includes an optical element. The optical element includes a first surface configured to receive light in a first direction and a second surface that is non-parallel to the first surface. The second surface is configured to transmit a first portion of the light in a second direction that is different from the first direction and internally reflect a second portion of the light that is distinct from the first portion of the light. The optical element further includes a third surface configured to receive the second portion of the light from the second surface and reduce internal reflection of the second portion of the light by the third surface. Also disclosed is a method of steering light by the optical device.

20 Claims, 10 Drawing Sheets

US 10,551,500 B2

INFRARED OPTICAL ELEMENT FOR PROXIMITY SENSOR SYSTEM

RELATED APPLICATION

This application is a continuation application of U.S. patent application Ser. No. 15/949,900, filed Apr. 10, 2018, which is incorporated by reference herein in its entirety.

TECHNICAL FIELD

This relates generally to headsets (e.g., head-mounted display devices), and especially to headsets with proximity sensors.

BACKGROUND

Headsets, including head-mounted display devices (also called herein head-mounted displays), are gaining popularity as a means for providing audio and/or visual information to a user. For example, head-mounted display devices are used for virtual reality and augmented reality operations.

Head-mounted display devices providing virtual and/or augmented reality content to a user have size and weigh limitations that create challenges for power consumption and management. In order to decrease their power consumption, head-mounted display devices may be designed to keep the power on only when worn by a user. Head-mounted display devices therefore require proximity sensor systems for determining that the device is worn by the user (e.g., by detecting the presence of user's head) in order to turn the display device on and off.

There is a need for low-cost proximity sensor systems applicable for head-mounted display devices with compact size and increased reliability.

SUMMARY

Accordingly, there is a need for proximity sensor systems for head-mounted displays that are compact and light, and that detect the presence of an object (e.g., the presence of a user's head) reliably. Sensor systems based on infrared (IR) sensing are applicable for such proximity sensor systems because IR sensing components (e.g., IR light sources and IR sensors) are in general economical, require little power, and are available in compact sizes. IR light is also unnoticeable by the user, and thereby does not interfere with a user's overall experience of using a head-mounted display device. However, in order to produce reliable results, the proximity sensor systems for head-mounted display devices require improved capability to direct IR light toward an optimized direction for illumination of a desired area of an object (e.g., user's head) as well as low-cost solutions for decreasing interfering light from entering a sensor (e.g., light internally reflected off of surfaces of the proximity sensor system and/or the head-mounted display device).

The above deficiencies and other problems associated with conventional proximity sensor systems are reduced or eliminated by the disclosed systems.

In accordance with some embodiments, a proximity sensor system for detecting the presence of an object proximate to the proximity sensor system includes a light emitter configured to project light in a first direction, an optical element configured to steer the light from the light emitter from the first direction to a second direction that is non-parallel to the first direction, and a sensor. The optical element has a first surface configured to receive the light from the light emitter and a second surface that is non-parallel to the first surface. The second surface is configured to transmit a first portion of the light in the second direction and internally reflect a second portion of the light from the light emitter that is distinct from the first portion of the light from the light emitter. The optical element also includes a third surface configured to prevent internal reflection of the second portion of the light by the third surface. The sensor is configured to detect at least a portion of the first portion of the light returned from the object and transmitted through the second surface and the first surface of the optical element.

In accordance with some embodiments, a method for detecting the presence of an object proximate to a proximity sensor system includes projecting, with a light emitter of the proximity sensor system, a light in a first direction. The method also includes receiving, with an optical element of the proximity sensor system, the light projected by the light emitter and steering the light projected by the light emitter to a second direction that is non-parallel to the first direction. The optical element has a first surface configured to receive the light from the light emitter and a second surface that is non-parallel to the first surface, the second surface configured to transmit a first portion of the light in the second direction and reflect a second portion of the light from the light emitter that is distinct from the first portion of the light from the light emitter. The optical element also has a third surface configured to prevent internal reflection of the second portion of the light by the third surface. The method also includes detecting, with a sensor of the proximity sensor system, at least a portion of the first portion of the light from the light emitter returned from the object and transmitted through the second surface and the first surface of the optical element.

In accordance with some embodiments, a headset includes the proximity sensor system described above.

Thus, the disclosed embodiments provide eye-tracking systems and methods for augmented reality and/or virtual reality operations.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
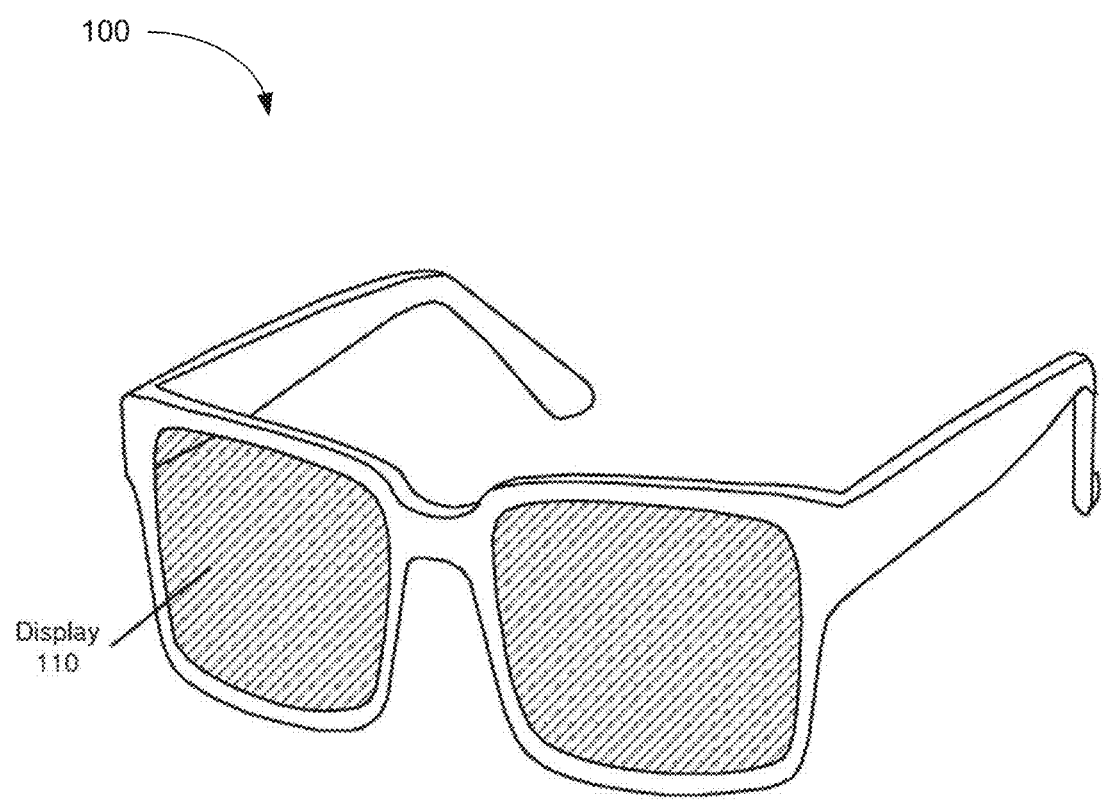
FIG. 1 is a perspective view of a display device in accordance with some embodiments.

These figures are not drawn to scale unless indicated otherwise.

DETAILED DESCRIPTION

Head-mounted display devices often require a proximity sensor system to determine that the display device is worn by a user. This allows the head-mounted display device to be turned on only when worn by a user, while maintaining the device off (e.g., in sleep mode or power saving mode) when not worn by the user. Such functionality decreases consumption of power and enables longer performance without charging and/or without increased battery capacity. Such functionally enhances the user experience with the head-mounted display device. The proximity sensor system needs to be compact and light, reliable, and preferably economical.

The disclosed embodiments provide low-cost, compact, and light proximity sensor systems (including those that can be implemented on head-mounted display devices) for reliable determination of the presence of an object.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first facet could be termed a second facet, and, similarly, a second facet could be termed a first facet, without departing from the scope of the various described embodiments. The first facet and the second facet are both facets, but they are not the same facet.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on the head of a user (e.g., by having the form of spectacles or eyeglasses, as shown in FIG. 1) or to be included as part of a helmet that is to be worn by the user. When display device 100 is configured to be worn on the head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
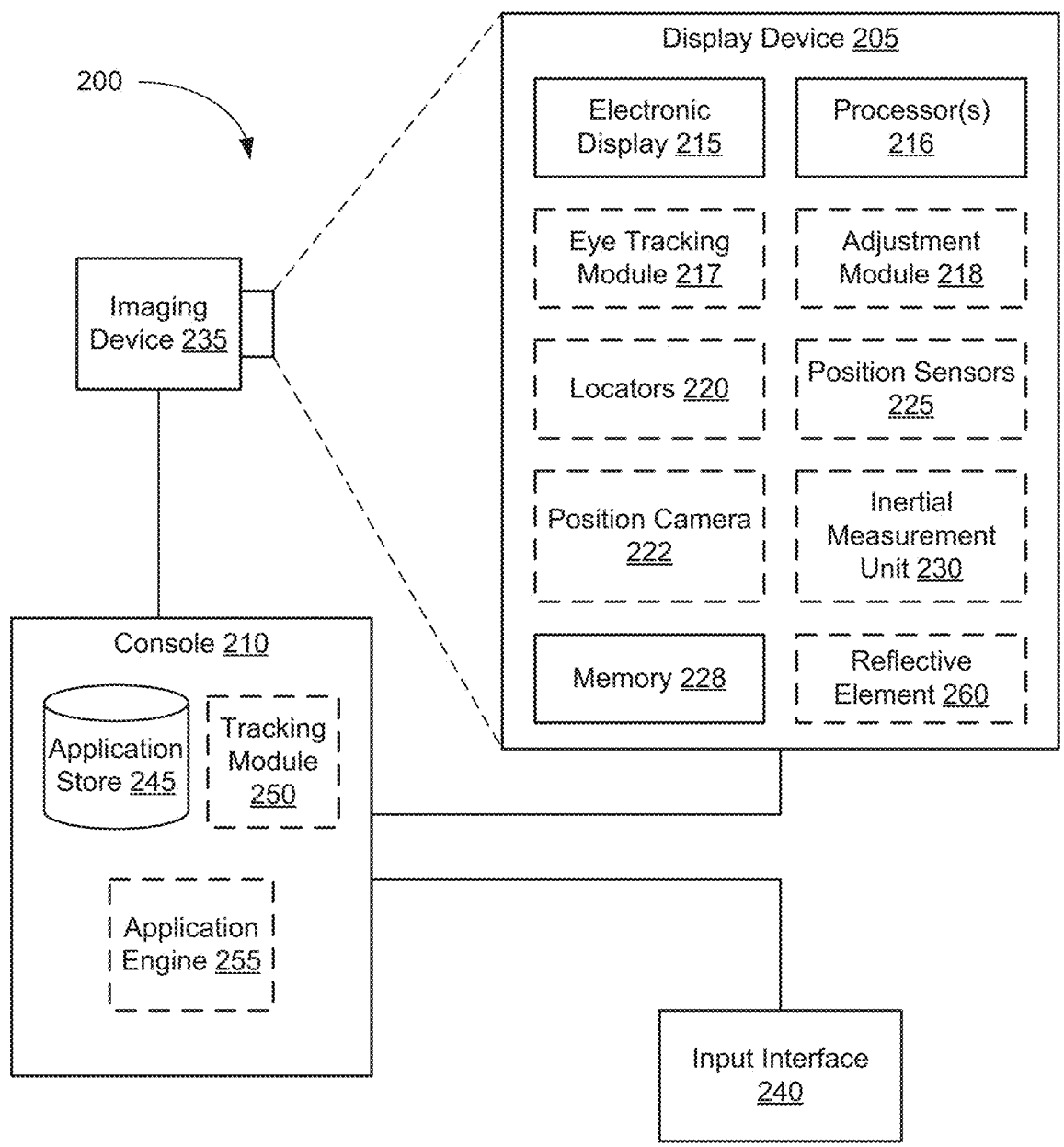
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240, which are each coupled to console 210. While FIG. 2 shows an example of system 200, including one display device 205, imaging device 235, and input interface 240, in other embodiments, any number of these components may be included in system 200. For example, there may be multiple display devices 205 each having an associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described herein can deliver virtual reality, mixed reality, and/or augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 may operate as a virtual reality (VR) device, an AR device, as glasses, or as some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, a laser, a fluorescent light source, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximal to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps receive signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR system described above.

Adjustment module 218 generates an image frame based on the determined locations of the pupils. In some embodiments, it sends a discrete image to the display that will tile subimages together, such that a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough not to substantially attenuate the wavelengths of light emitted or reflected by locators 220.

Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

Inertial Measurement Unit (IMU) 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so that it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Optionally, imaging device 235 is configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal distance, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, a touch controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, educational applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
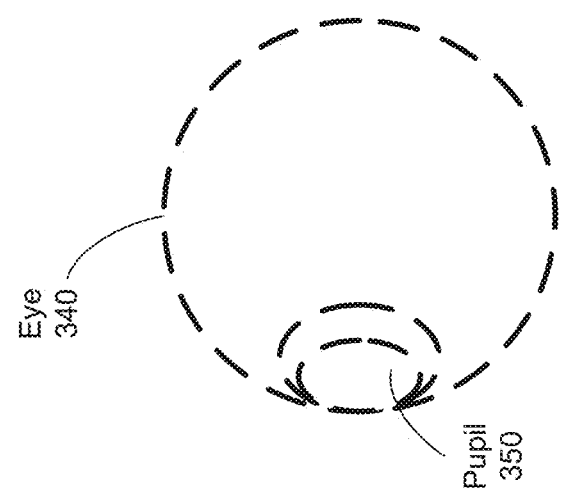
FIG. 3 is an isometric view of a display device in accordance with some embodiments.
Figure 3:
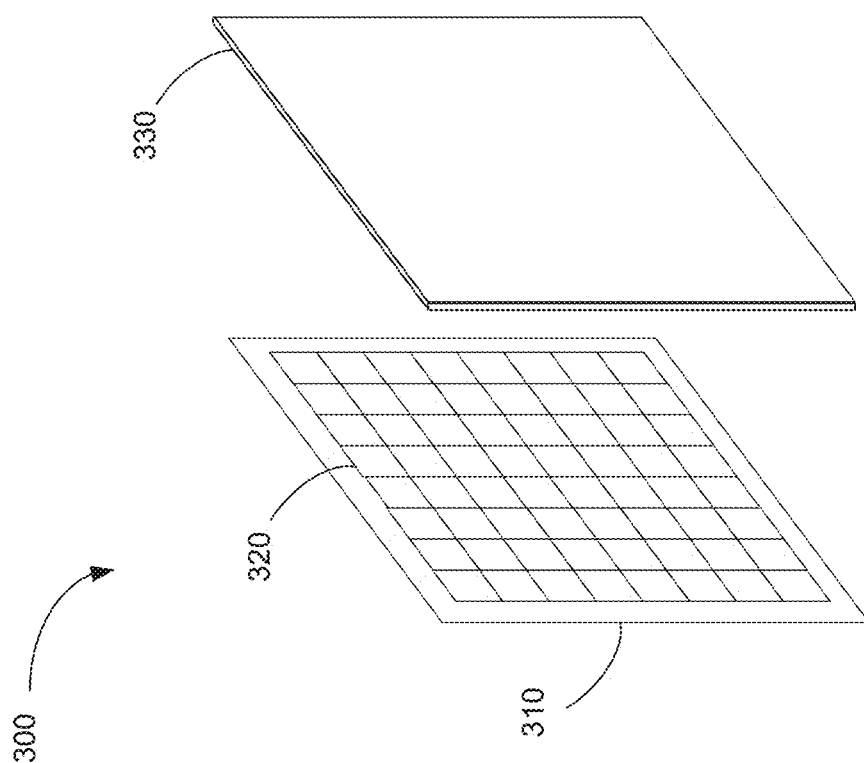

FIG. 3 is an isometric view of display device 300 in accordance with some embodiments. In some other embodiments, display device 300 is part of some other electronic display (e.g., digital microscope, a mobile device, a smartphone etc.). In some embodiments, display device 300 includes light emission device array 310, and one or more lenses 330. In some embodiments, display device 300 also includes an emission intensity array and IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more lenses 330. In some embodiments, display device 300 uses an emission intensity array to facilitate providing image light to a location of pupil 350 of eye 340 of a user, and minimize the amount of image light provided to other areas in the eyebox.

One or more lenses 330 receive the modified image light (e.g., attenuated light) from the emission intensity array (or directly from emission device array 310), and direct the shifted image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device array 310.

Figure 4A:
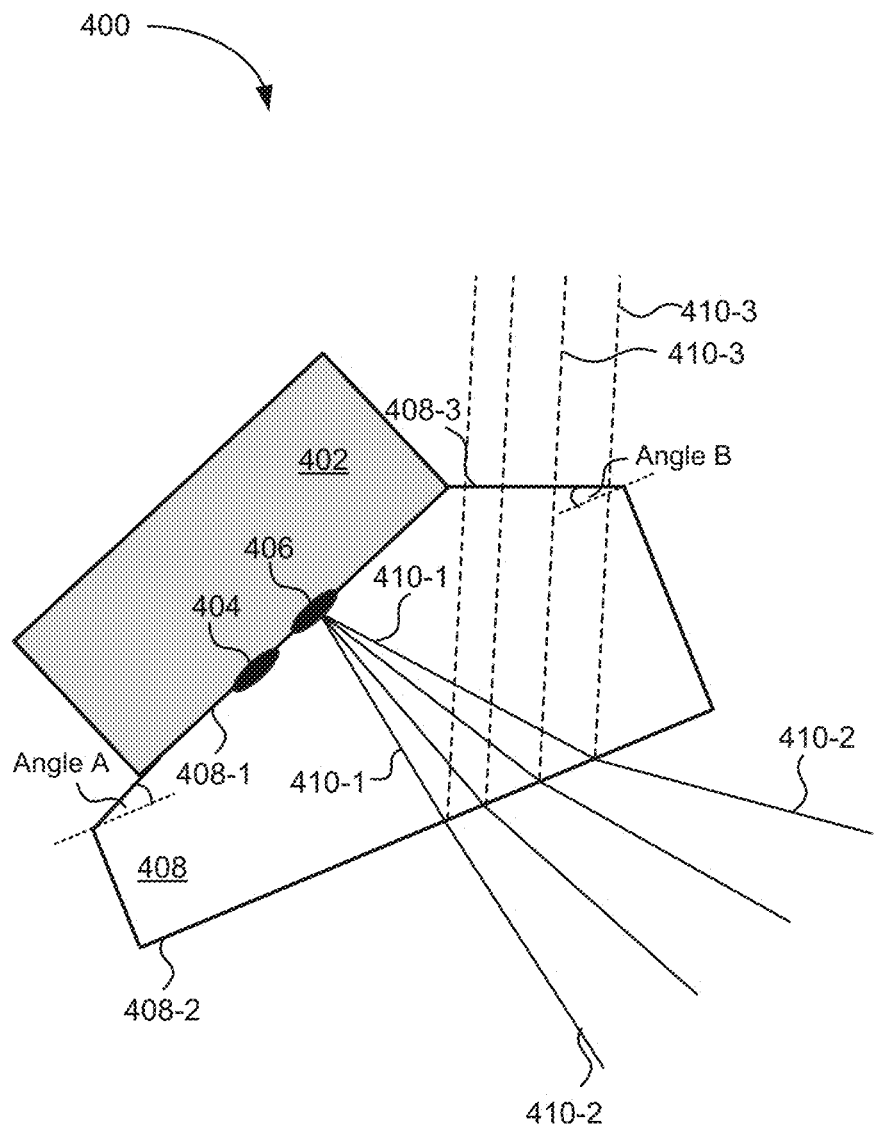
FIG. 4A is a schematic diagram illustrating a proximity sensor system in accordance with some embodiments.

FIG. 4A is a schematic diagram illustrating proximity sensor system 400. In some embodiments, proximity sensor system 400 is included in, or is coupled with, a wearable device, such as a headset (e.g., a head-mounted display device). Proximity sensor system 400 includes emitter and sensor unit 402 and optical element 408. Emitter and sensor unit 402 includes sensor 404 and light emitter 406. Light emitter 406 is configured to emit light (e.g., light 410, including light 410-1 that is directed in first direction and then refracted as light 410-2 in a second direction). The light emitted by light emitter 406 is configured to illuminate a detectable area of an object. In an instance of a head-mounted display device, the light is directed so that the light illuminates a portion of a body part of a user when the display device is worn by the user. In some embodiments, the light illuminates the forehead and/or the nose area of the user. In some embodiments, the light is non-visible light, so that it does not distract a user viewing content provided by a display. In some embodiments, the light is infrared (IR) light (e.g., NIR light). In some embodiments, light source 406 is a laser (e.g., a pixel laser), an LED, a microLED, or other type of light emitting device). Sensor 404 is configured to detect light emitted by light emitter 406 reflected off a surface of an object to determine the presence of the object. In some embodiments, sensor 404 detects light reflected off the forehead and/or nose area of a user. In some embodiments, sensor 404 is an IR sensor (e.g., a NIR sensor), such as a photodiode or other sensor configured to detect IR wavelengths.

Emitter and sensor unit 402 is optically coupled with optical element 408 so that sensor 404 and light emitter 406 are facing optical element 408. In some embodiments, emitter and sensor unit 402 is adjacent to optical element 408 (e.g., emitter/sensor is coupled with, or attached to, optical element 408). In some embodiments, emitter and sensor unit 402 is separated from optical element 408 (e.g., emitter and sensor unit 402 is positioned in vicinity to optical element 408). Optical element 408 is configured to steer light (e.g., light 410-1) emitted by light emitter 406 to the second direction (e.g., light 410-1 in the first direction is refracted by optical element 408 to the second direction as light 410-2). Optical element is made of a material suitable for transmitting light 410-1 (e.g., plastic or glass). In some embodiments, optical element 408 is made of IR transmitting plastic (e.g., NIR transmitting plastic). In some embodiments, optical element 408 is made of IR transmitting polycarbonate (PC). Optical element 408 includes facets 408-1, 408-2, and 408-3, that are all non-parallel to each other. Facet 408-1 defines angle A with respect to a reference line parallel to facet 408-2 and facet 408-3 defines angle B with respect to a reference line parallel to facet 408-2. Angle A and angle B are greater than zero degrees. In FIG. 4A, facets 408-1, 408-2, and 408-3 are all smooth surfaces. In some embodiments, the facets include coatings (e.g., anti-reflection coatings for IR light). In some embodiments, facet 408-2 and facet 408-3 include anti-reflection coatings for preventing internal reflections of light (e.g., IR light) impinging on them.

Light 410-1 is received by facet 408-1 of optical element 408 so that the incident angle is less than a critical angle for light 410-1, and is thereby transmitted through facet 408-1. In some embodiments, the incident angle of light 410-1 impinging on facet 408-1 is zero degrees, or approximately zero degrees. Light 408-1 impinges on facet 408-2 at an angle distinct from a surface normal to facet 408-2. A portion of light 410-1 impinging on facet 408-2 is refracted by facet 408-2 and exits optical element 408 in the second direction, illustrated by light 408-2, toward a detectable area of an object (e.g., the forehead or the nose of a wearer of proximity sensor system 400). Angle A defined by facet 408-1 and the reference line parallel to facet 408-2 is optimized so that light 410-2 refracted by facet 408-2 illuminates a desired portion of a detectable area of an object.

Another portion of light 410-1 is internally reflected upon impinging on facet 408-2, as illustrated by light 410-3 reflected toward facet 408-3. Facet 408-3 is adjacent and non-parallel to facet 408-1. Facet 408-3 is configured to prevent internal reflection of light 410-3 impinging on facet 408-3. The prevention of the internal reflection of light 410-3 increases the reliability of determining the presence of an object, because such internal reflections may interfere with light reflected off of the detectable object. In some embodiments, facet 408-3 is a flat surface. Angle B defined by facet 408-3 and the reference line parallel to facet 408-2 is optimized so that light 410-3 impinges on facet 408-3 at an angle that is less than a critical angle for light 410-2 (e.g., an IR light), and is thereby transmitted through facet 408-3. In some embodiments, the angle of incidence of light 408-2 impinging on facet 408-3 is zero degrees or approximately zero degrees.

Figure 4B:
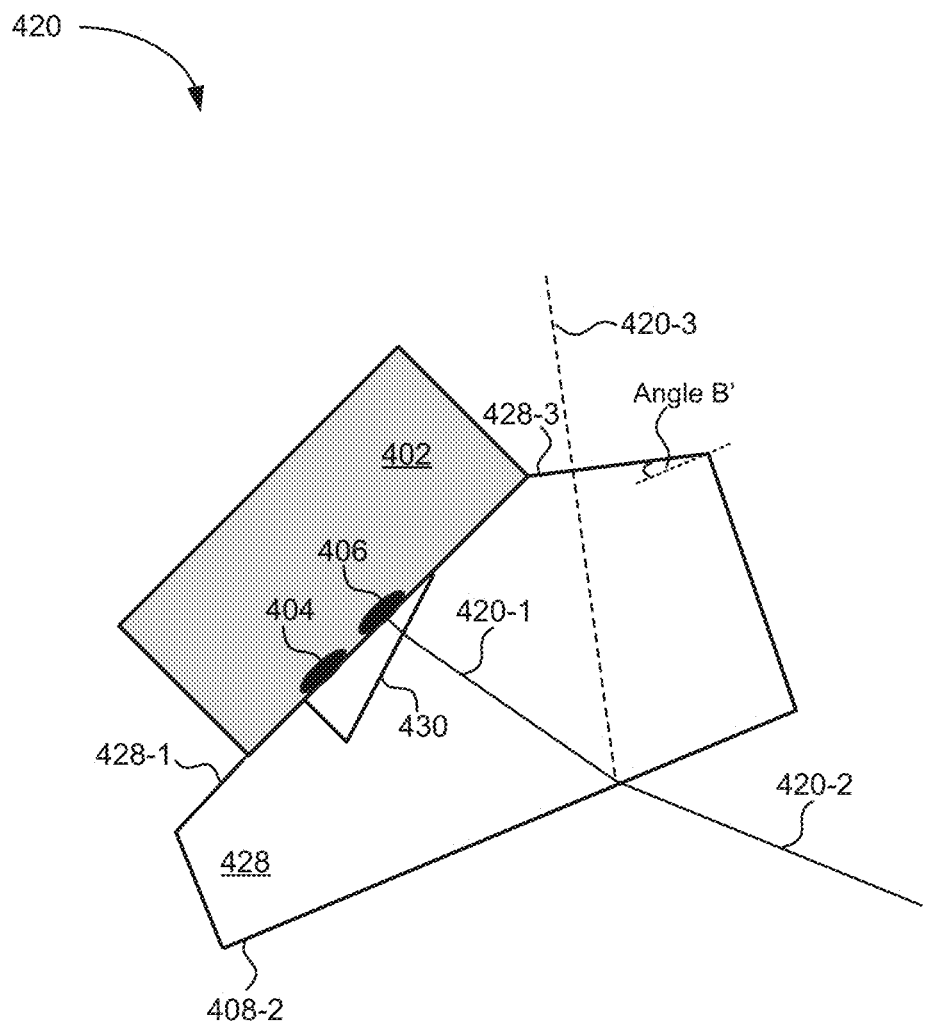
FIG. 4B is a schematic diagram illustrating a proximity sensor system in accordance with some embodiments.

FIG. 4B is a schematic diagram illustrating proximity sensor system 420. Proximity sensor system 420 corresponds to proximity sensor system 400 described above with respect to FIG. 4A, except that proximity sensor system 420 includes facet 428-1, which includes structure 430. In some embodiments, structure 430 is a Fresnel structure, or a prism structure. Structure 430 is configured to steer light 420-1 emitted by light emitter 406, thereby changing the directions of light 420-1 and light 420-2. Consequently, light 420-3 is internally reflected off facet 408-2 at a different angle compared to light 410-3 in FIG. 4B. Thereby, angle B' defined by facet 420-3 and the reference line parallel to facet 408-2 is optimized so that light 420-3 impinges on facet 420-1 with an incident angle of zero degrees or approximately zero degrees.

Figure 4C:
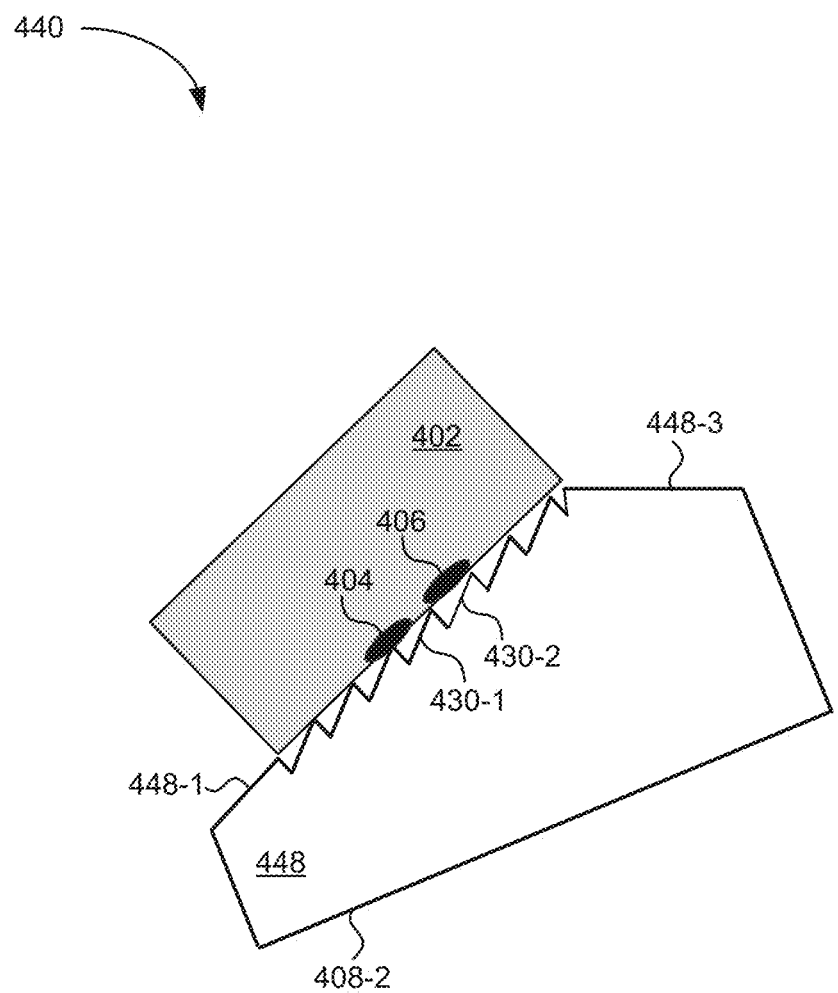
FIG. 4C is a schematic diagram illustrating a proximity sensor system in accordance with some embodiments.

FIG. 4C is a schematic diagram illustrating proximity sensor system 430. Proximity sensor system 440 corresponds to proximity sensor system 420 described above with respect to FIG. 4B, except that proximity sensor system 440 includes facet 448-1. Facet 448-1 corresponds to facet 428-1 of FIG. 4B, except that facet 448-1 includes a plurality of structures 430 (e.g., structures 430-1 and 430-2). In some embodiments, surface 448-1 is configured to further change a direction of light emitted by light emitter 406 (e.g., light 410-1 in FIG. 4A). In some embodiments, surface 448-1 is configured to focus or defocus the light emitted by light emitter 406.

Figure 4D:
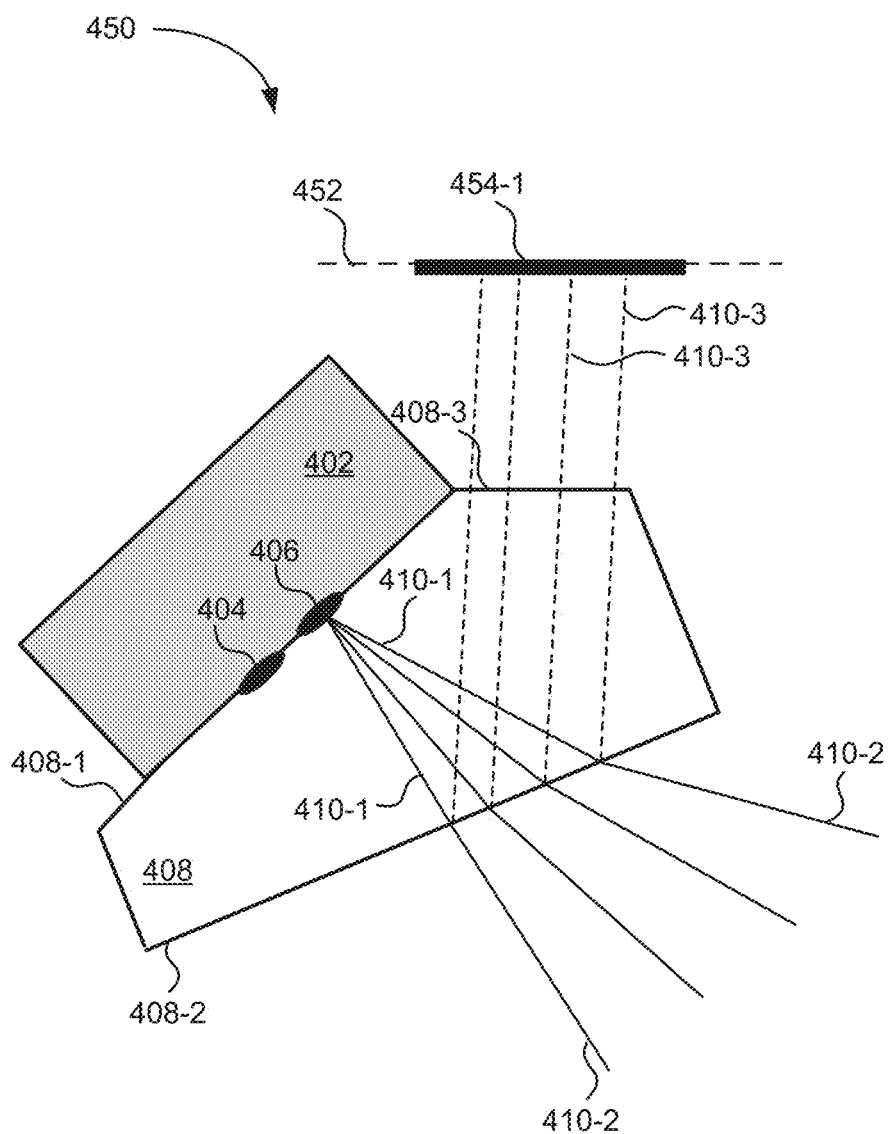
FIG. 4D is a schematic diagram illustrating a proximity sensor system in accordance with some embodiments.

FIG. 4D is a schematic diagram illustrating proximity sensor system 450. Proximity system 450 corresponds to proximity sensor system 400 described above with respect to FIG. 4D, except that proximity sensor system 450 includes absorbing material 454-1. Absorbing material 454-1 is configured to absorb light 410-3 exiting optical element 408 through facet 408-3 to prevent further reflection of light 410-3 within a device that includes proximity sensor system 450. In some embodiments, proximity sensor system 450 is included in a headset (e.g., a head-mounted display device) and absorbing material 454-1 is configured to prevent reflection of light 410-3 off surfaces of the headset. Absorbing material 454-1 increases the reliability of determining the presence of an object by proximity sensor system 450, because reflection of light 41-3 may cause false positive detection events when detected by sensor 404. In some embodiments, absorbing material 454-1 is an absorbing tape. In some embodiments, absorbing material is a coating (e.g., a surface coated with absorbing paint). In FIG. 4D, absorbing material 454-1 is positioned away from facet 408-1. In some embodiments, absorbing material 454-1 is attached to or coupled with a surface (e.g., surface 452) of the device including proximity sensor system 450 (e.g., a surface of a headset including proximity sensor system 450).

Figure 4E:
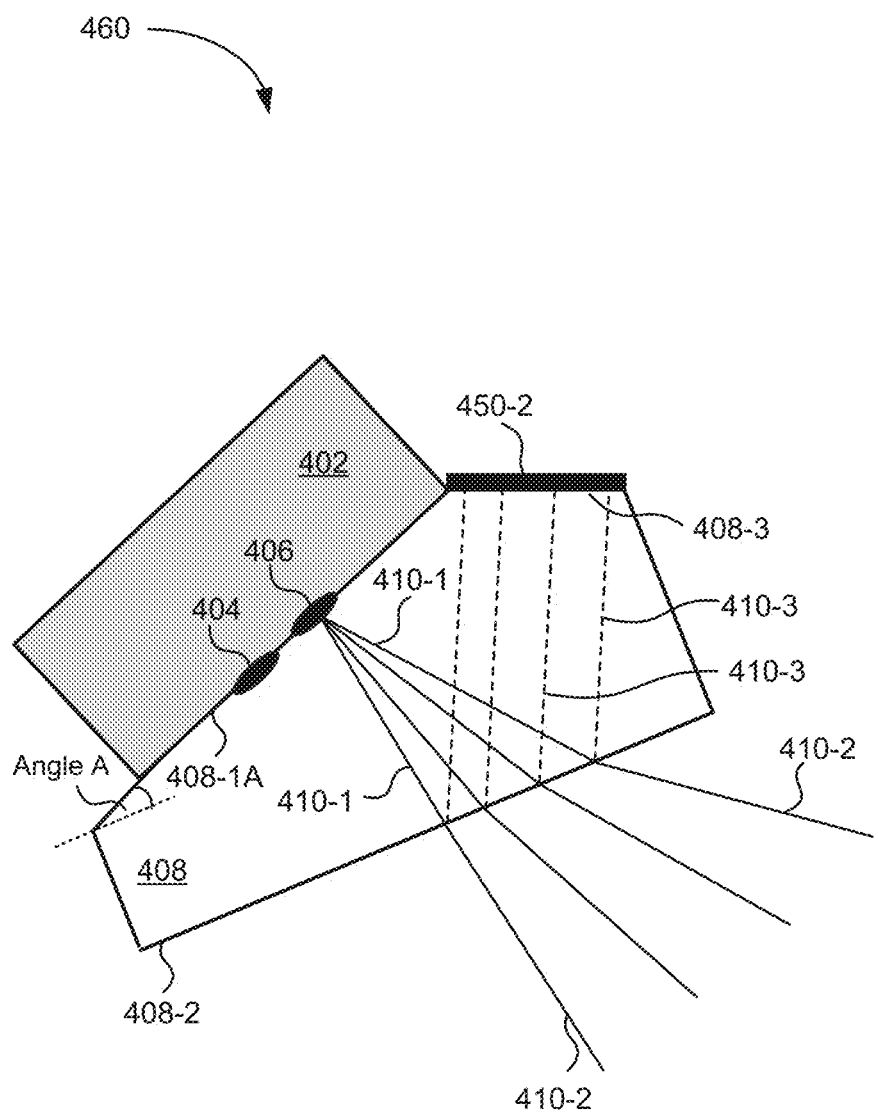
FIG. 4E is a schematic diagram illustrating a proximity sensor system in accordance with some embodiments.

FIG. 4E is a schematic diagram illustrating proximity sensor system 460. Proximity sensor system 460 corresponds to proximity sensor system 450 described above with respect to FIG. 4D, except that proximity sensor system 460 includes absorbing material 450-2 positioned on facet 408-3 (e.g., attached to or coupled with facet 408-3).

The embodiments of a proximity sensor system described above with respect to FIGS. 4A-4E provide for a compact and light weight system for reliably determining the presence of an object. Such proximity sensor systems are also economical. In particular, the optical element (e.g., optical element 408) of the proximity sensor system may be manufactured from low-cost material (e.g., polycarbonate) with simple processing (e.g., injection molding), without any requirement for additional processing (e.g., adding coatings). The described design of the optical element (e.g., a shape defined by facets 408-1, 408-2, and 408-3) further allows prevention of internal reflections with a low-cost solution by adding absorbing material (e.g., an absorbing tape) to absorb light exiting the optical element.

Figure 5:
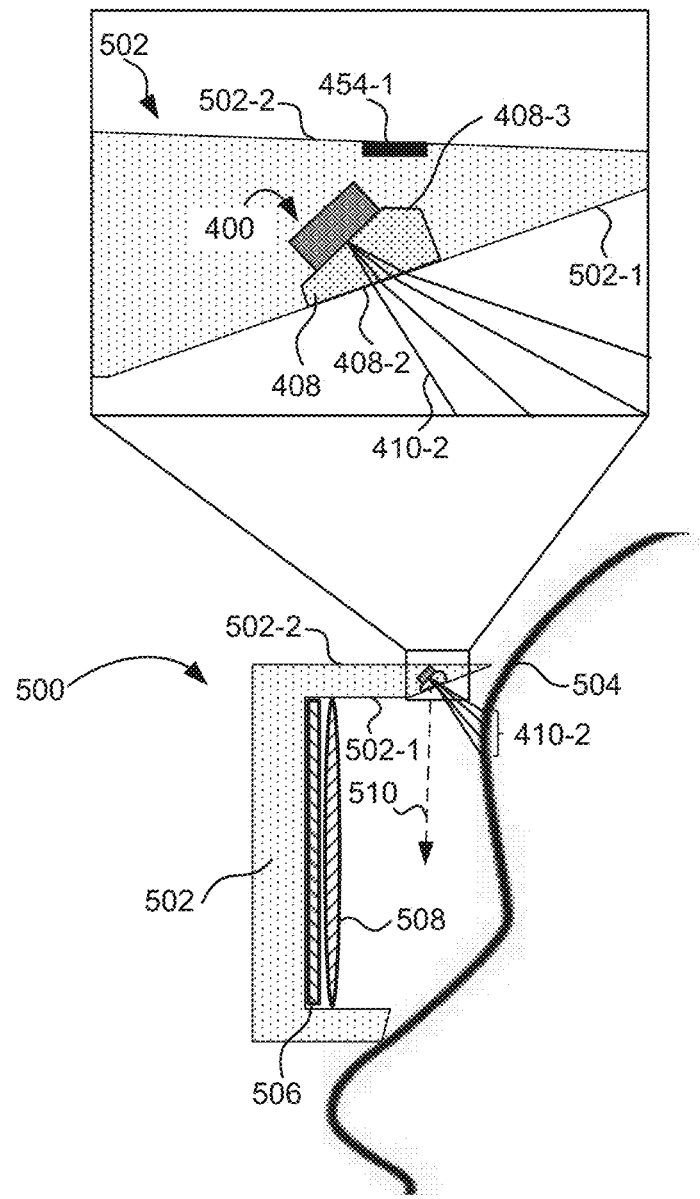
FIG. 5 is a schematic diagram illustrating a cross-sectional profile of a headset worn by a user in accordance with some embodiments.

FIG. 5 is a schematic diagram illustrating a cross-sectional profile of headset 500 worn by user 504. Headset 500 includes frame 502 with inner surface 502-1 and outer surface 502-2. Proximity sensor system 400 is embedded in frame 502. As shown in the inset of FIG. 5, facet 408-2 of optical element 408 of proximity sensor system 400 is roughly parallel to and aligned with inner surface 502-1 that is adjacent to facet 408-2. Optical element 408 does not protrude from or recess in frame 502. Optical element 408 refracts light 410-2 toward user 504. Angle A shown in FIG. 4A is optimized in order to refract light 410-2 toward a desired region of a head of user 504. In FIG. 5, optical element 408 directs light 410-2 toward the forehead region of user 504. In the inset of FIG. 5, absorbing material 454-1 is positioned attached to a surface of frame 502 facing facet 408-3 of optical element 408.

Reference arrow 510 in FIG. 5 illustrates a direction of light (e.g., light 410-1 in FIG. 4A) projected by proximity sensor system 400 without steering by optical element 408-2. Such light is directed toward the nose of user 504, which might not produce as reliable determination of the presence of user 504 as the forehead area. In some instances, a portion of light 510 may impinge on inner surface 502-1 of frame 502 in the lower portion of frame 502. In such instances, inner surface 502-1 may reflect the light back and cause a false positive detection by proximity sensor system 400. For example, light reflected off of inner surface 502-1 produces a positive detection even when the user is not wearing headset 500.

In some embodiments, headset 500 is a head-mounted display device including display 506 and one or more lenses 508. Display 506 and one or more lenses 508 are coupled with, embedded into, or attached to frame 502 (e.g., inner surface 502-1 of frame 502). Optical element 408 directs light 410-2 away from display device 506 and one or more lenses 508 toward user 504. In some embodiments, headset 500 is a head-mounted display device corresponding to display device 300 described above with respect to FIG. 3. In some embodiments, display device 500 is configured to provide augmented reality and/or virtual reality content to user 504. In some embodiments, headset 500 is an audio headset configured to provide audio content to a user.

Figure 6:
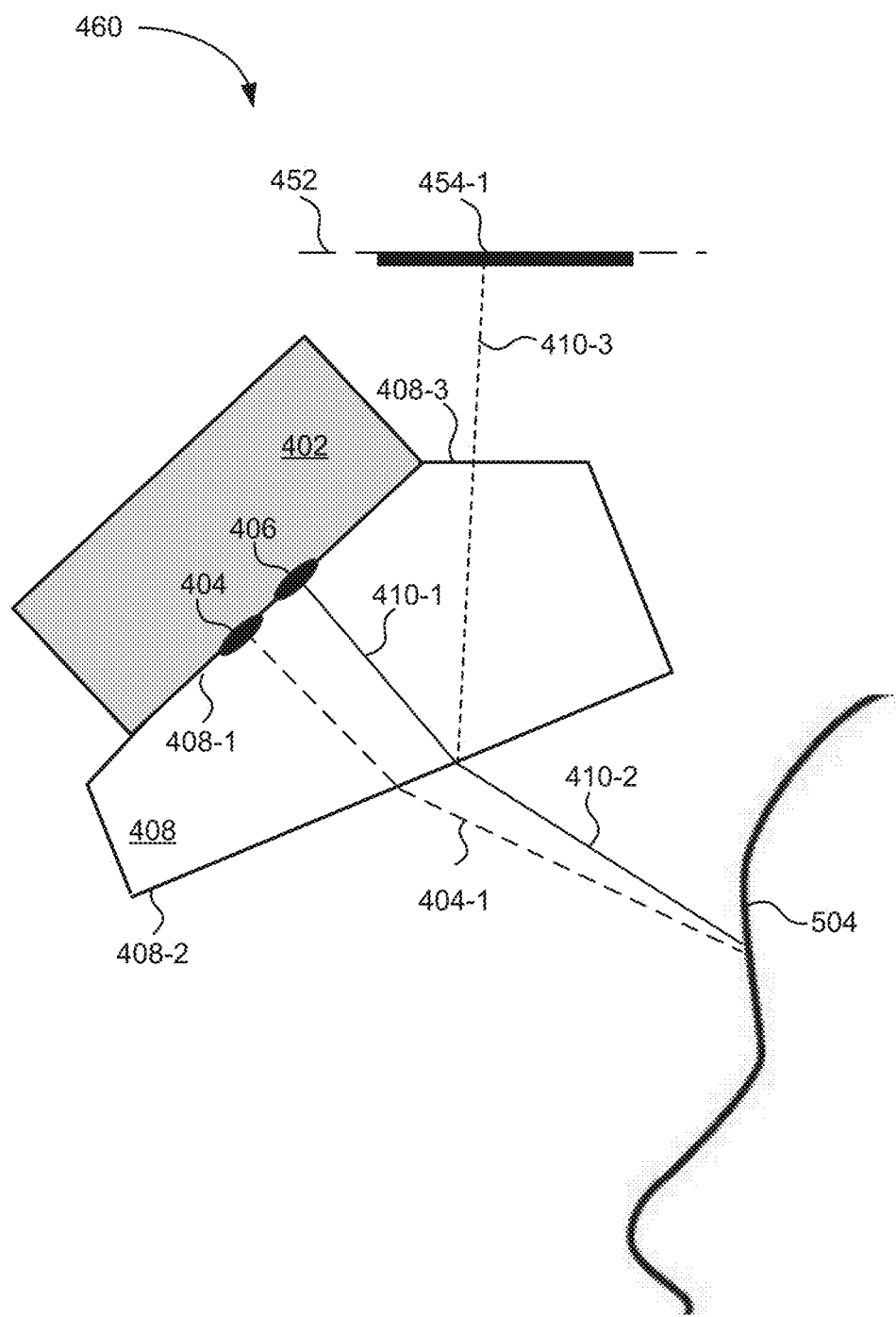
FIG. 6 is a schematic diagram illustrating a method for detecting the presence of an object proximate to a proximity sensor system in accordance with some embodiments.

FIG. 6 is a schematic diagram illustrating a method for detecting the presence of an object proximate to proximity sensor system 400. Light projector 406 projects light 410-1 in a first direction (e.g., the first direction corresponding to a direction of surface normal to light projector 406). The light is received by facet 408-1 of optical element 408. Light 410-1 impinges of facet 408-2, which is non-parallel to facet 408-1. Facet 408-2 transmits (e.g., refracts) light 410-2 toward a second direction which is toward an object of interest. In FIG. 6, light 410-2 is directed toward user 504 (e.g., the forehead of user 504). Sensor 404 detects light (e.g., light 404-1) reflected off the object of interest and transmitted through optical element 408 toward sensor 404. In some embodiments, determining whether the object is in proximity to proximity sensor system 400 is based on an intensity of light (e.g., intensity of light 404-1) detected by sensor 404. A portion of light 410-1 impinging on facet 408-2 is internally reflected toward facet 408-3 that is configured to prevent further internal reflection of the light impinging on facet 408-3 by allowing light 410-3 to exit optical element 408. In FIG. 6, light 410-3 exits optical element 408 through facet 408-3 and is absorbed by absorbing material 454-1 positioned away from optical element 408.

In light of these principles, we now turn to certain embodiments.

In accordance with some embodiments, a proximity sensor system (e.g., proximity sensor system 400 in FIG. 4A) for detecting the presence of an object proximate to the proximity sensor system includes a light emitter configured to project light in a first direction (e.g., light emitter 406 projecting light 410-1), an optical element configured to steer the light from the light emitter from the first direction to a second direction that is non-parallel to the first direction (e.g., optical element 408 steering light 410-1 to a different direction as light 410-2), and a sensor (e.g., sensor 404). The optical element has a first surface configured to receive the light from the light emitter (e.g., facet 408-1 receives light 410-1 from light emitter 406) and a second surface that is non-parallel to the first surface (e.g., facet 408-2 is non-parallel to facet 408-1). The second surface is configured to transmit a first portion of the light in the second direction and internally reflect a second portion of the light from the light emitter that is distinct from the first portion of the light from the light emitter (e.g., facet 408-2 refracts a portion of light 410-1 as light 408-2 and internally reflects a portion of light 410-1 as light 410-3). The optical element also includes a third surface configured to prevent internal reflection of the second portion of the light by the third surface (e.g., facet 408-3 is configured to prevent internal reflection of light 410-3 by facet 408-3). In some embodiments, the third surface is configured to prevent internal reflection of at least a substantial portion of the second portion of the light by the third surface. The sensor is configured to detect at least a portion of the first portion of the light returned from the object and transmitted through the second surface and the first surface of the optical element (e.g., sensor 404 detects light 404-1 reflected off the forehead of user 504 and transmitted through optical element 408 in FIG. 6).

In some embodiments, the proximity sensor system is for a wearable device (e.g., headset 500 in FIG. 5).

In some embodiments, the light emitter and the sensor are coupled to form an integrated combination of the light emitter and the sensor (e.g., light emitter 406 and sensor 404 are coupled to form emitter and sensor unit 402 in FIG. 4A).

In some embodiments, the light from the light emitter (e.g., light 410-1 from light emitter 406) is an infrared light (e.g., a near-infrared light).

In some embodiments, the second direction is different from a surface normal of the second surface (e.g., light 410-2 is steered to a direction different from a surface normal to facet 408-2).

In some embodiments, the third surface is a flat surface (e.g., facet 408-3 is flat in FIG. 4A).

In some embodiments, the third surface is adjacent to the first surface, and the third surface is non-parallel to the first surface and to the second surface (e.g., facet 408-3 is adjacent to facet 408-1 and non-parallel to facet 408-1 and facet 408-2 in FIG. 4A).

In some embodiments, the third surface is configured so that the second portion of the light impinges on the third surface at an angle that is less than a critical angle for the second portion of the light (e.g., light 410-3 impinges on facet 408-3 at an incident angle that is less than a critical angle for light 410-3, and is thereby transmitted through facet 408-3 in FIG. 4A). In some embodiments, the angle of incidence of the second portion of the light on the third surface is zero degrees, or proximately zero degrees.

In some embodiments, the first surface is configured so that the light emitted from the light emitter impinges on the first surface at an angle that is less than a critical angle for the light emitted from the light emitter (e.g., light 410-1 impinges on facet 408-1 at an incident angle that is less than a critical angle for light 410-1, and is thereby transmitted through facet 408-1 in FIG. 4A). In some embodiments, the angle of incidence of the light emitted from the light emitter on the first surface is zero degree or approximately zero degrees.

In some embodiments, the first surface is a smooth surface (e.g., facet 408-1 is smooth in FIG. 4A). In some embodiments, the first surface is a structured surface. In some embodiments, the first surface includes one or more structures, such as prisms or Fresnel structures (e.g., facet 428-1 in FIG. 4B includes structure 430). In some embodiments, the first surface includes a plurality of Fresnel structures (e.g., facet 448-1 in FIG. 4C includes a plurality of structures 430, such as structures 430-1 and 430-2).

In some embodiments, the second surface is configured so that the light from the first surface impinges on the second surface at an angle that is distinct from a surface normal of the second surface (e.g., facet 408-1 is non-parallel to surface 408-2 and light 410-1 impinges on facet 408-2 at an angel that is distinct from a surface normal of facet 408-2 in FIG. 4A).

In some embodiments, the system further includes an absorbing material configured to absorb a portion of the light from the light emitter exiting from the optical element through the third surface (e.g., absorbing material 454-1 in FIG. 4D). In some embodiments, the absorbing material is an absorbing tape, or a surface painted with an absorbing coating or paint.

In some embodiments, the absorbing material is positioned on the third surface (e.g., absorbing material 454-2 is positioned on facet 408-3 in FIG. 4E). For example, the absorbing material is attached to the third surface.

In some embodiments, the absorbing material is positioned away from the third surface (e.g., absorbing material 454-1 is positioned away from facet 408-3 in FIG. 4D). For example, the absorbing material is attached to a surface (e.g., surface 452 in FIG. 4D), such as a surface of a headset, that is facing the third surface.

In accordance with some embodiments, a method for detecting the presence of an object proximate to a proximity sensor system includes projecting, with a light emitter of the proximity sensor system, a light in a first direction (e.g., light emitter 406 projects light 410-1 in FIG. 6). The method also includes receiving, with an optical element of the proximity sensor system, the light projected by the light emitter and steering the light projected by the light emitter to a second direction that is non-parallel to the first direction (e.g., optical element 408 receives light 410-1 and steers light 410-1 as light 410-2). The optical element (e.g., optical element 400) has a first surface configured to receive the light from the light emitter and a second surface that is non-parallel to the first surface, the second surface configured to transmit a first portion of the light in the second direction and reflect a second portion of the light from the light emitter that is distinct from the first portion of the light from the light emitter. The optical element also has a third surface configured to prevent internal reflection of the second portion of the light by the third surface. The method also includes detecting, with a sensor of the proximity sensor system, at least a portion of the first portion of the light from the light emitter returned from the object and transmitted through the second surface and the first surface of the optical element (e.g., sensor 404 detects light 404-1, which is reflected off the forehead of user 504).

In some embodiments, the method includes determining whether the object is in proximity to the proximity sensor system based on an intensity of light detected by the sensor (e.g., intensity of light 404-1 in FIG. 6).

In some embodiments, the proximity sensor system is coupled with a headset (e.g., proximity sensor system 400 is coupled with headset 500 in FIG. 5) and the method includes determining whether the headset is worn by a wearer in accordance with a determination whether the object is in proximity to the proximity sensor system. For example, whether headset 500 is worn by user 504 is determined in accordance with a determination whether the forehead of user 504 is in proximity to proximity sensor 400 in FIG. 5).

In some embodiments, the second direction is directed away from the headset (e.g., light 410-2 is steered away from headset 500 in FIG. 5).

In accordance with some embodiments, a headset includes the proximity sensor system described above (e.g., headset 500 in FIG. 5).

In some embodiments, the proximity sensor system is embedded in a frame of the headset (e.g., proximity sensor system 400 is embedded in frame 502 of headset 500 in FIG. 5), and the second surface of the optical sensor is parallel to a surface, of the frame of the headset, adjacent to the second surface of the optical sensor (e.g., facet 408-2 is parallel to inner surface 502-1 of frame 502 in the inset of FIG. 5).

In some embodiments, the headset further includes one or more displays and one or more lenses (e.g., display device 500 includes display 506 and one or more lenses 508 in FIG. 5).

In some embodiments, the second direction is directed away from the one or more displays and the one or more lenses (e.g., light 410-2 is directed away from display 506 and one or more lenses 508 in FIG. 5). In some embodiments, the first direction is directed toward a portion of the headset (e.g., reference arrow 510 indicates direction of light projected from proximity sensor system 400 toward a lower portion of headset 500 without the steering by optical element 508 in FIG. 5).

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:
1. An optical device comprising:
    an optical element, the optical element including:
        a first surface configured to receive light in a first direction;
        a second surface that is non-parallel to the first surface, the second surface configured to transmit a first portion of the light in a second direction that is different from the first direction and internally reflect a second portion of the light that is distinct from the first portion of the light; and a third surface configured to receive the second portion of the light from the second surface and reduce internal reflection of the second portion of the light by the third surface.

2. The optical device of claim 1, further including a light emitter configured to project the light in the first direction toward the first surface of the optical element.

3. The optical device of claim 2, wherein the first surface is configured so that the light emitted from the light emitter impinges on the first surface at an angle that is less than a critical angle for the light emitted from the light emitter.

4. The optical device of claim 2, further including an absorbing material configured to absorb a portion of the light from the light emitter exiting from the optical element through the third surface.

5. The optical device of claim 4, wherein the absorbing material is positioned on the third surface.

6. The optical device of claim 4, wherein the absorbing material is positioned away from the third surface.

7. The optical device of claim 1, wherein the first surface includes a structured surface.

8. The optical device of claim 7, wherein the first surface includes a prism structure, the prism structure configured to receive the light in the first direction and steer the light to a third direction distinct from the first direction and the second direction.

9. The optical device of claim 7, wherein the first surface includes a plurality of Fresnel structures.

10. The optical device of claim 1, wherein the second surface includes an anti-reflection coating.

11. The optical device of claim 1, wherein the second direction is different from a surface normal of the second surface.

12. The optical device of claim 1, wherein the third surface is a flat surface.

13. The optical device of claim 1, wherein the third surface is adjacent to the first surface, and the third surface is non-parallel to the first surface and to the second surface.

14. The optical device of claim 13, wherein the third surface is configured so that the second portion of the light impinges on the third surface at an angle that is less than a critical angle for the second portion of the light.

15. The optical device of claim 1, wherein the second surface is configured so that the light from the first surface impinges on the second surface at an angle that is distinct from a surface normal of the second surface.

16. The optical device of claim 1, wherein the optical element is made of infrared transmitting plastic and the light is infrared light.

17. The optical device of claim 1, further including a sensor configured to detect at least a portion of the first portion of the light returned from an object outside the optical device and transmitted through the second surface and the first surface of the optical element.

18. A method of steering light, the method comprising:
   at an optical device including an optical element having a first surface, a second surface, and a third surface:
      receiving, on the first surface, light in a first direction;
      transmitting, through the second surface that is non-parallel to the first surface, a first portion of the light in a second direction that is different from the first direction;
      internally reflecting, at the second surface, a second portion of the light that is distinct from the first portion of the light;
      receiving, with the third surface, the second portion of the light from the second surface; and
      reducing internal reflection of the second portion of the light on the third surface.

19. The method of claim 18, further including:
   projecting, with a light emitter, the light in the first direction toward the first surface of the optical element.

20. The method of claim 18, wherein the first surface includes a prism structure, and the method further includes receiving, with the prism structure, the light in the first direction and steering the light to a third direction distinct from the first direction and the second direction.

* * * * *